US012322299B2

(12) United States Patent
Tunik et al.

(10) Patent No.: US 12,322,299 B2
(45) Date of Patent: Jun. 3, 2025

(54) COMPUTER-IMPLEMENTED METHODS AND SYSTEMS FOR DESIGNING AND CONDUCTING VIRTUAL REALITY EXPERIMENTS

(71) Applicant: Northeastern University, Boston, MA (US)

(72) Inventors: Eugene Tunik, Windham, NH (US); Mathew Yarossi, Medford, MA (US); Samuel Berin, Boston, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 17/745,272

(22) Filed: May 16, 2022

(65) Prior Publication Data

US 2022/0366803 A1 Nov. 17, 2022

Related U.S. Application Data

(60) Provisional application No. 63/189,395, filed on May 17, 2021.

(51) Int. Cl.
G09B 5/02 (2006.01)
G06F 3/01 (2006.01)
G09B 19/00 (2006.01)
G09B 23/30 (2006.01)

(52) U.S. Cl.
CPC ............... G09B 5/02 (2013.01); G06F 3/011 (2013.01); G09B 19/00 (2013.01); G09B 23/30 (2013.01)

(58) Field of Classification Search
CPC ........ G09B 23/28; G09B 23/30; G09B 19/00; G06F 3/011; G06F 3/016; G06F 3/20
See application file for complete search history.

(56) References Cited

U.S. PATENT DOCUMENTS

| 9,795,446 | B2* | 10/2017 | DiMaio | A61B 34/10 |
| 2017/0169142 | A1* | 6/2017 | Van der Velden | G06T 9/00 |
| 2018/0356893 | A1* | 12/2018 | Soni | G06F 3/014 |
| 2019/0101981 | A1* | 4/2019 | Elias | A41D 19/00 |
| 2019/0122576 | A1* | 4/2019 | Kamali-Sarvestani | G09B 19/00 |
| 2019/0318659 | A1* | 10/2019 | Hamadani | G06F 3/011 |

OTHER PUBLICATIONS

Gantzer et al (Year: 2020).*
Han et al. "An Implementation of VR Chemistry Experiment System". BDIOT '17: Proceedings of the International Conference on Big Data and Internet of Thing, pp. 205-208 (Year: 2017).*

* cited by examiner

Primary Examiner — Robert J Utama
(74) Attorney, Agent, or Firm — Foley Hoag LLP; Dana M. Gordon; Erik A. Huestis

(57) ABSTRACT

Computer-implemented methods and systems are disclosed for designing and conducting virtual reality experiments. The method includes the steps of: (a) providing a configuration user interface through a computer system enabling a user to design a virtual reality experiment by integrating one or more peripheral sensors in an immersive virtual environment; (b) running the virtual reality experiment configured in step (a) and collecting experiment data from the one or more peripheral sensors; and (c) outputting the experiment data.

14 Claims, 10 Drawing Sheets

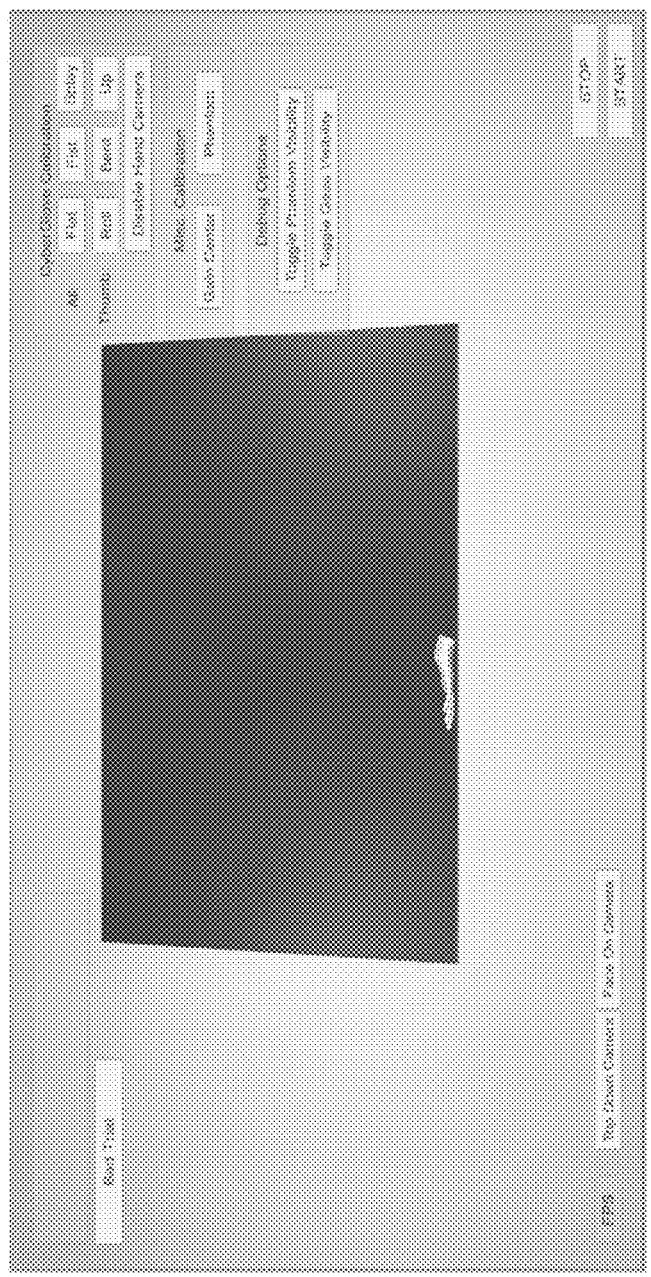
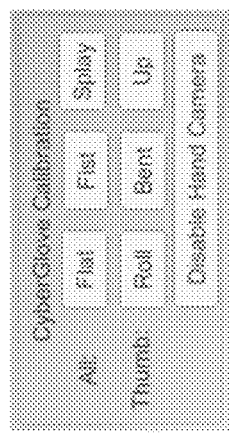
FIG. 8
FIG. 7

FIG. 9

| Property | Trial Number | File Name | Condition | PPT Gain | Digital Channel 0 Initial State | Digital Channel 0 React To | Digital Ch |
|---|---|---|---|---|---|---|---|
| Property | Trial Number | File Name | Condition | PPT Gain | Digital Channel 0 Initial State | Digital Channel 0 React To | Digital Ch |
| Property | Trial Number | File name | Condition | PPT Gain | Digital Channel 0 Initial State | Digital Channel 0 React To | Digital Ch |
| Data | 1 | 001_Sam17102019.xml | DGP_NoPertNoTMS_LO | 1 | False | Switch Release | 0 |
| Data | 2 | 002_Sam17102019.xml | DGP_NoPertNo_TMS_S0 | 1 | False | Switch Release | 0 |
| Data | 3 | 003_Sam17102019.xml | DGP_NoPertNoTMS_LO | 1 | False | Switch Release | 0 |
| Data | 4 | 004_Sam17102019.xml | DGP_PertTMS_S0 | 1 | False | Switch Release | 0 |
| Data | 5 | 005_Sam17102019.xml | DGP_NoPertTMS_S0 | 1 | False | Switch Release | 0 |
| Data | 6 | 006_Sam17102019.xml | DGP_PertTMS_S0 | 1 | False | Switch Release | 0 |
| Data | 7 | 007_Sam17102019.xml | DGP_PertNoTMS_S0 | 1 | False | Switch Release | 0 |
| Data | 8 | 008_Sam17102019.xml | DGP_NoPertTMS_S0 | 1 | False | Switch Release | 0 |
| Data | 9 | 009_Sam17102019.xml | DGP_NoPertTMS_S0 | 1 | False | Switch Release | 0 |
| Data | 10 | 010_Sam17102019.xml | DGP_PertNoTMS_S0 | 1 | False | Switch Release | 0 |
| Data | 11 | 011_Sam17102019.xml | DGP_PertTMS_S0 | 1 | False | Switch Release | 0 |
| Data | 12 | 012_Sam17102019.xml | DGP_NoPertNo_TMS_S0 | 1 | False | Switch Release | 0 |
| Data | 13 | 013_Sam17102019.xml | DGP_PertNoTMS_S0 | 1 | False | Switch Release | 0 |
| Data | 14 | 014_Sam17102019.xml | DGP_NoPertNo_TMS_S0 | 1 | False | Switch Release | 0 |
| Data | 15 | 015_Sam17102019.xml | DGP_NoPertNo_TMS_S0 | 1 | False | Switch Release | 0 |
| Data | 16 | 016_Sam17102019.xml | DGP_NoPertNo_TMS_S0 | 1 | False | Switch Release | 0 |
| Data | 17 | 017_Sam17102019.xml | DGP_NoPertNoTMS_S0 | 1 | False | Switch Release | 0 |
| Data | 18 | 018_Sam17102019.xml | DGP_NoPertNoTMS_S0 | 1 | False | Switch Release | 0 |
| Data | 19 | 019_Sam17102019.xml | DGP_NoPertNoTMS_LO | 1 | False | Switch Release | 0 |

FIG. 10

COMPUTER-IMPLEMENTED METHODS AND SYSTEMS FOR DESIGNING AND CONDUCTING VIRTUAL REALITY EXPERIMENTS

CROSS REFERENCE TO RELATED APPLICATIONS

This application claims priority from U.S. Provisional Patent Application No. 63/189,395 filed on May 17, 2021 entitled VIRTUAL REALITY EXPERIMENT DESIGNER, which is hereby incorporated by reference.

STATEMENT AS TO FEDERALLY SPONSORED RESEARCH

This invention was made with government support under Grant No. N5085122 awarded by the NIH National Institutes of Health and Grant Nos. CBET 1804550 and CMMI 1935337 awarded by the NSF National Science Foundation. The government has certain rights in the invention.

BACKGROUND

The present application relates generally to virtual reality (VR) experiments and, more particularly, to computer-implemented methods and systems for designing and conducting such experiments.

BRIEF SUMMARY OF THE DISCLOSURE

In accordance with one or more embodiments, a computer-implemented method is provided for designing and conducting virtual reality experiments. The method includes the steps of: (a) providing a configuration user interface through a computer system enabling a user to design a virtual reality experiment by integrating one or more peripheral sensors in an immersive virtual environment; (b) running the virtual reality experiment configured in step (a) and collecting experiment data from the one or more peripheral sensors; and (c) outputting the experiment data.

In accordance with one or more further embodiments, a computer system is provided comprising at least one processor, memory associated with the at least one processor, a display, and a program stored in the memory for designing and conducting virtual reality experiments. The program contains a plurality of instructions which, when executed by the at least one processor, cause the at least one processor to: (a) provide a configuration user interface enabling a user to design a virtual reality experiment by integrating one or more peripheral sensors in an immersive virtual environment; (b) run the virtual reality experiment configured in (a) and collect experiment data from the one or more peripheral sensors; and (c) output the experiment data.

BRIEF DESCRIPTION OF THE DRAWINGS

FIG. 4 is a screen shot of an exemplary UI enabling a user to create a new file for a virtual reality experiment in accordance with one or more embodiments.

FIG. 5 is a screen shot of an exemplary UI containing information on virtual objects in a scene in accordance with one or more embodiments.

FIG. 6 is a screen shot of an exemplary UI containing information on each trial in the experiment in accordance with one or more embodiments.

FIG. 7 is a screen shot of an exemplary UI showing a Cyberglove Calibration Panel in accordance with one or more embodiments.

FIG. 8 is a screen shot of an exemplary UI showing a top-down view of a scene in a virtual reality experiment in accordance with one or more embodiments.

FIG. 9 is a table showing an example of Trial Data in accordance with one or more embodiments.

FIG. 10 is a table showing an example of an Object-Data.csv file in accordance with one or more embodiments.

DETAILED DESCRIPTION

Figure 1C:
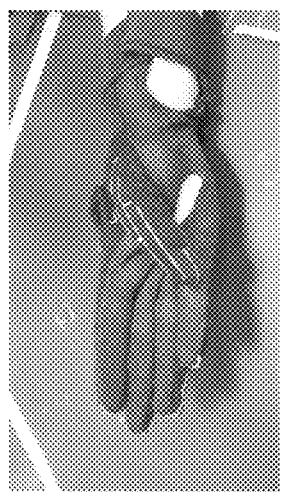
FIGS. 1A-1E are photographs showing various exemplary poses for calibrating a data glove used in a virtual reality experiment in accordance with one or more embodiments.

The use of virtual environments in human behavioral research and training is experiencing rapid growth. A need exists for a computer platform that enables users to design virtual reality experiments by flexibly integrating multiple peripheral sensors with a virtual environment that is configurable from an easy-to-use user interface. Such a platform would allow human movement researchers to avoid hiring costly skilled computer programmers to create custom software for their particular experiments.

In one or more embodiments, a software platform is provided for studying and training human upper limb motor behavior in a computerized immersive virtual environment. The platform comprises two interfaced but independent programs: an Experiment Designer or Virtual Experiment Creator (VEC) and an Experiment Runner or Virtual Experiment Launcher (VEL). The VEC has a user interface that is designed for easy-to-use configuration of a large number of virtual environment parameters such as addition of peripheral sensors, placement of virtual objects, and the physics of the environment. The VEL is a Unity based virtual environment designed specifically for the study of human motor behavior. Multiple peripheral sensors can be incorporated, including sensors to accurately portray dexterous movement of the upper limb, hand, and fingers. Data from all sensors is synchronously collected and exported for analysis. Device triggering for synchronization with currently unsupported peripherals is also provided.

The software platform reduces the cost of entry for using virtual environments to study and train human upper limb motor behavior. By reducing cost barriers, the software platform is part of the next wave of innovation for VR based surgical training and physical rehabilitation.

The software platform offers multiple advantages over prior methods for designing and conducting virtual reality experiments. The software platform allows easy synchronization of multiple unrelated commonly used hardware peripherals for measurement of human motor behavior (e.g., motion capture devices, data gloves, inertial measurement unit (IMU) sensors, eye tracking). The software platform reduces the need for programmers to customize experiments. In addition, the software platform can be used to easily design uniquely customized experiments, in or out of virtual reality.

Additional advantages include a reduction in the number of programmer-hours needed to prepare a lab to conduct virtual reality experiments. The software platform also reduces the workload to change experiments or add new elements to existing experiments.

Furthermore, the software platform provides an improved hand model for dexterous interactions. It allows for more flexibility in designing and running experiments quickly. It allows for easy use of common peripherals that a lab might already own. It is easy to use for people with limited or no programming experience. It synchronizes a myriad of devices into an easy to use data sheet.

There are numerous potential applications of the software platform. For instance, the software platform can be used in investigations of human visuomotor behavior and perception. The software platform can also be used in research and design of ergonomic virtual environments for prototyping (e.g., control panels and flight controls). In addition, the software platform can be used for motor skill training for industrial applications. The software platform can also be used in rehabilitation from motor impairment.

The virtual reality experiments typically take place in a virtual environment with virtual objects appearing as designed in the Experiment Designer. The solution synchronizes various data capture peripherals and integrates multiple peripherals into the virtual environment. The modular nature of the experiment designer allows for large variations in individual trials in the experiment. After each trial, relevant data can exported, e.g., to .csv data sheets, for easy analysis. The program supports a variety of motion capture and reactive devices for a diverse set of possible experiments.

As used herein, a trial refers to a discrete unit of data collection. Experiment refers to a collection of trials conducted continuously. Trigger refers to an event, real or virtual, that causes a change in the state of the program. A peripheral refers to a device integrated with the program, which allows for data capture or environmental manipulation. Calibration refers to a routine or series of routines conducted to ensure data capture accuracy.

The Experiment Designer creates the experiment structure. The Experiment Designer (a) sets specific events to occur during the experiment, (b) stores information about the subject, (c) indicates which devices will be used during the experiment, (d) configures virtual objects for the experiment, and (e) outputs a file (e.g., a .json file) containing the information needed to start the Experiment Runner.

Figure 3:
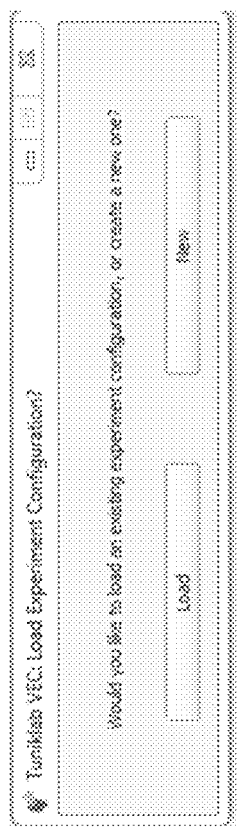
FIG. 3 is a screen shot of an exemplary UI enabling a user to create a new configuration file or import an existing file in accordance with one or more embodiments.

The Experiment Designer can be used as follows. The user opens the program and is given the option to create a new configuration file or import an existing file as shown in the example UI screenshot of FIG. 3.

If the user imports a file, they will be taken to the final screen for editing the per-trial configurations. In one or more embodiments, a user may not be able to go back to a previous page while maintaining the contents of the current page. Going back to a previous page will reset the contents of the page the user is currently on.

Figure 4:
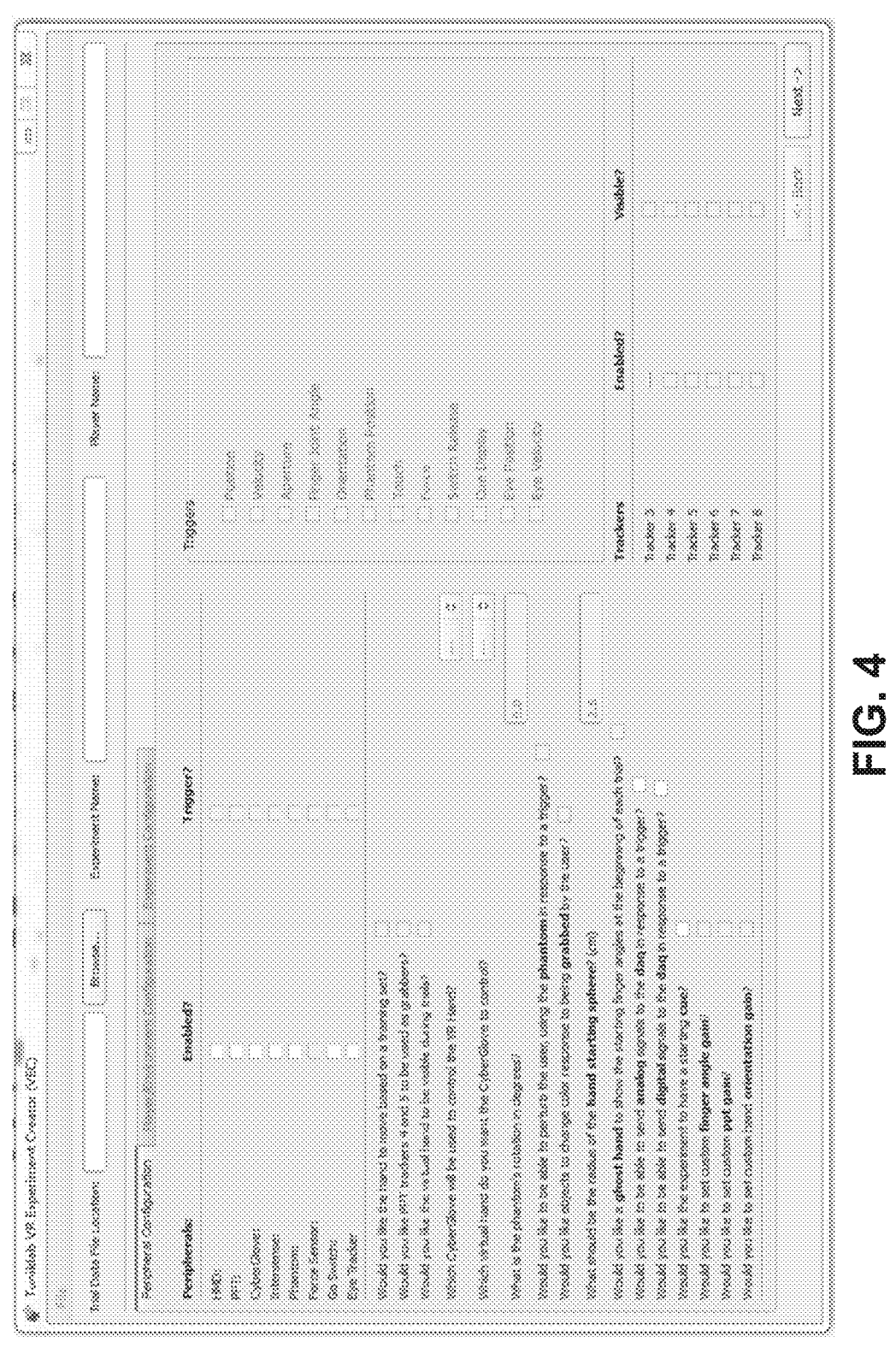

When the user creates a new file, the first page is designated for per-experiment configurations as shown in the example UI screenshot of FIG. 4 through selection of the "Peripheral Configuration" tab.

Checkboxes on this page allow users to select which devices are enabled and which are used as triggers. If a device is marked as enabled and used as a trigger, the user will have to also mark which trigger the user specifically wants available. For example, if the Cyberglove is active and used as a trigger, the user will additionally mark "Finger Angle Trigger" or "Finger Aperture Trigger."

Figure 5:
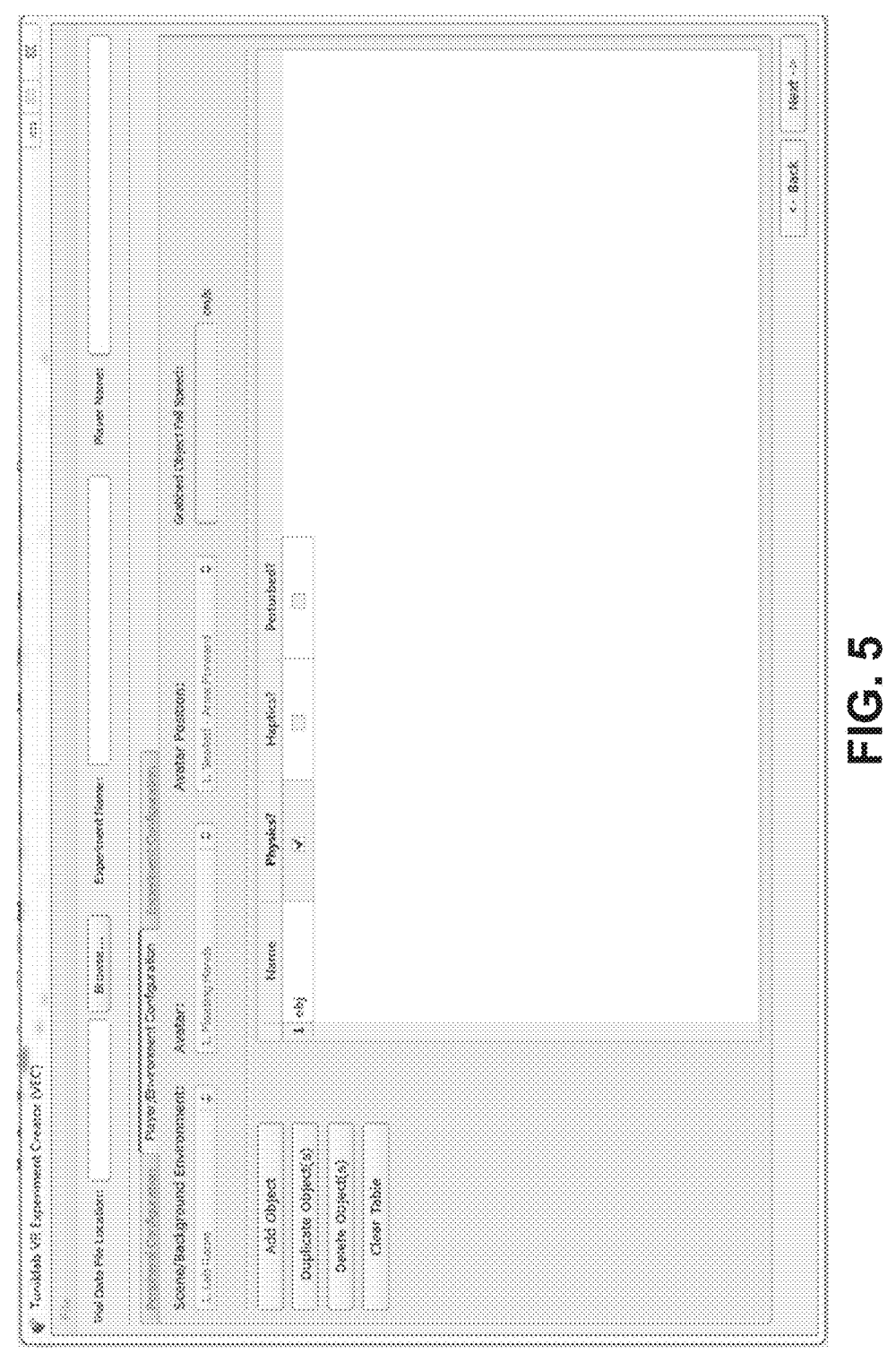

The second page shown in FIG. 5 (accessible by selecting the "Player/Environment Configuration" tab) contains information on virtual objects in the scene. The user has the option to create as many objects as are needed in the virtual scene. A single object does not have to maintain the same shape, dimensions, or positions across trials.

Each object can be named and have options to enable Unity's physics engine, perturbability, or haptic feedback.

Figure 6:
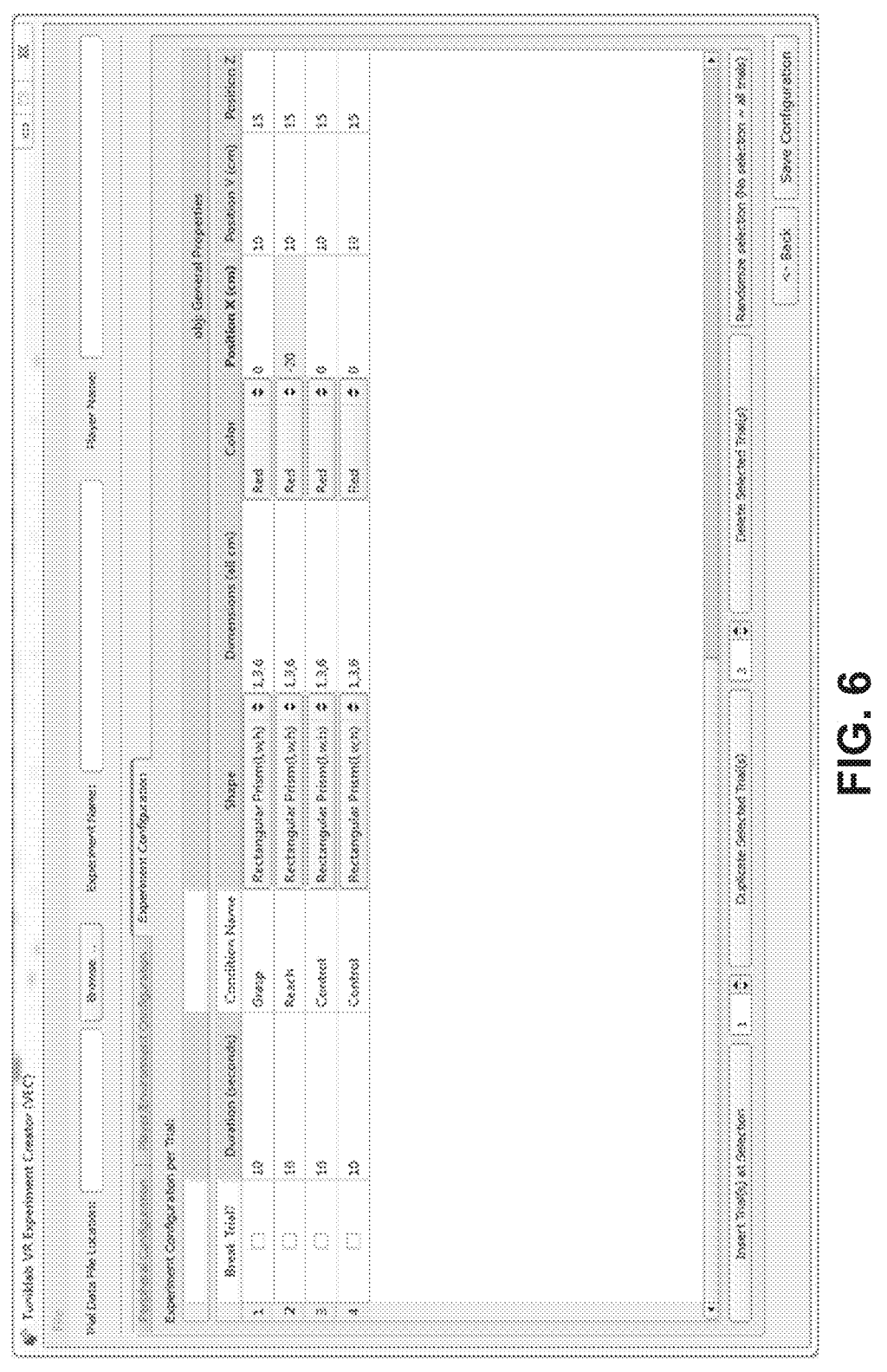

The third page shown in FIG. 6 (accessible by selecting the "Experiment Configuration" tab) contains information on each trial in the experiment.

Objects are defined per trial with shapes, dimensions, and positions. Any object that is perturbed will have all of these fields for both pre- and post-perturbation, as well as an option to choose which trigger perturbs the object. Duration of trials can be set. The option exists to mark trials as break trials during which execution of the program continues but no objects render and no data is gathered. Settings can be changed for device specific parameters. For example, if finger angle gain is enabled, a column will allow users to set finger angle gain to be a different value for every trial.

Along the top of the page, users will have the option to set the data output directory, name the experiment, and name the subject.

After filling out the desired number of trials, a user can save the file to a chosen directory.

A .json file containing the experiment structure can be imported into the Experiment Runner.

Related technologies include PyQt4 (a GUI based design program for Python, wrapped over the C++ design program Qt) and Py2Exe (a wrapper that allows Python programs to run as Windows executable).

The Experiment Runner program conducts experiments using the experiment structure set by file output. The Experiment Runner outputs data from experiments. It outputs object data file, which details position and description of objects set in the Experiment Runner. The Experimental Runner also outputs "bad" trials list, which is a text document detailing trials marked as "bad" during the running of the experiment. If no trials are marked as "bad", no file is output.

In addition, the Experimental Runner outputs per trial data sheet. One file is exported per trial. The file contains information on events observed during a single trial. Columns are added based on what peripherals are added. For example, if the Cyberglove is active, an output data sheet will track all real-world finger angles, all virtual finger angles, virtual finger-tip aperture, and abduction values between fingers. The data sheet also includes information on the capture rate determined by headset and capture frequency tied to headset refresh rate. For Oculus DK II (Refresh rate 60 hz): ~13 ms between data capture. For Vive Pro (Refresh rate 90 hz): ~11 ms between data capture.

Prior to starting the Experiment Runner, the user enables tools based on active devices. For instance, if the Cyberglove is active, the user turns on the Cyberglove Device Configuration Utility and connects the glove. If the precise positional tracking (PPT) trackers are active, the user turns on the PPT program. If the eye-trackers are active, the user turns on the Pupil Service program.

The Experiment Runner is then run.

A calibration file created in the Experiment Designer is imported.

If the eye trackers are enabled, eye tracking calibration is performed. Several dots will appear in the headset, one at a time. The subject is directed to focus their attention at the center of each dot as it appears.

The program starts and displays the pre-experiment UI on top of the scene. There is no UI display inside the headset. Only the virtual scene is rendered in the headset. The experimenter UI is displayed on the computer running the program. There are several options only displayed on the desktop version of the program: (1) FPS counter: there is a box in the bottom left hand corner showing the current number of frames displayed per second. (2) Title Display box: In the upper left hand corner, there is a box displaying the title of the experiment, which is set in the Experiment Designer. While an experiment is running, the condition name of the current trial is displayed here. (3) Timer box: In the upper left hand corner, there is a box displaying the time remaining in the trial. While not conducting a trial, this box is empty. (4) Bad trial button: Underneath the title display box is a button marked "Bad Trial." If this button is pressed during an experiment, the program will add the number of the current trial to the "Bad Trial" list output at the end of the experiment. (5) Camera Buttons: If a headset is not connected the program, two buttons will be displayed on the button left hand corner of the screen. Top-down Camera button: Moves the display underneath the UI to show the scene from a camera above the scene, facing down. Face-on Camera button: Moves the display underneath the UI to show the scene from a camera in the middle of the scene, facing "front". The scene is described in more detail below. (6) Recenter HMD Button: If a headset is connected, a button will appear in the bottom left corner of the screen. This button, when pressed, will allow you to recenter the rotational origin of the headset. If using the Oculus DK II, the recenter screen button will make it so the direction the headset currently faces will be the forward direction in the scene. If using the Vive Pro, the recenter screen button will set the direction the headset currently faces to the forward direction in the scene. It will also recenter the position of the headset to an established position above and behind the table. (7) Start Button: Displayed in the bottom right hand corner, and will start the first trial if clicked. The Start Button will be unable to be clicked if there are still devices that need calibration within the scene. Stop button: Displayed in the bottom right hand corner, which will close the program if pressed. (9) Calibration Control Buttons: Displayed in the upper right hand corner. There are two buttons: one for importing of Cyberglove Calibration data and one for the manual creation of a new Cyberglove calibration. FIG. 7 shows an example of the resulting Cyberglove Calibration Panel if a new calibration is selected. (10) Hand Camera Button: If the Cyberglove is active and visible in the virtual scene, the user will have the option to toggle on or off a copy of the hand.

Figure 2:
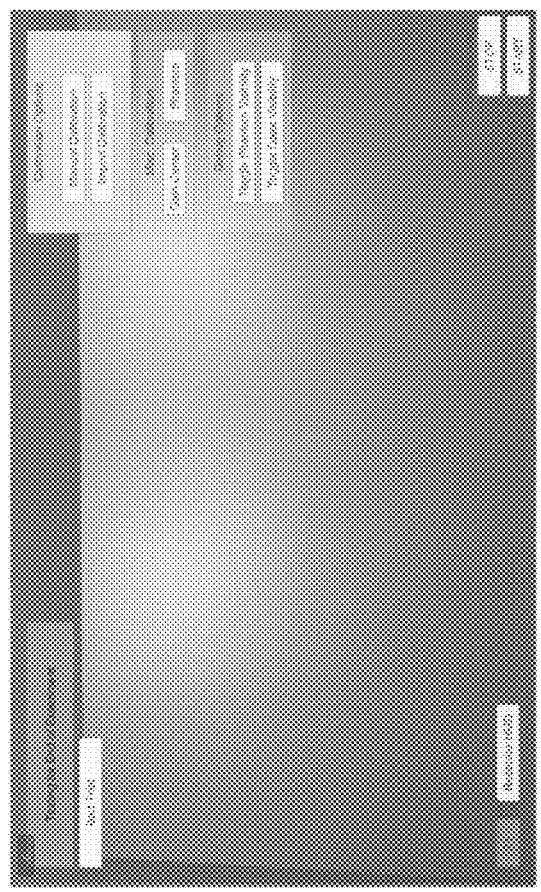
FIG. 2 is a screen shot of an exemplary experimenter UI in accordance with one or more embodiments.

The scene is rendered in the headset and behind the experimenter UI. An example of the experimenter UI is shown in FIG. 2. The scene includes a single brown table in the middle of a room. The room is lit from above by two lights. The room is surrounded by walls. A top-down view of the scene is shown in FIG. 8.

If the PPT trackers are enabled and visible, as configured in the Experiment Designer, they will be represented by small white dots in the scene. If trackers 4 and 5 are marked as grabbers in the Experiment Designer, they will be represented by small green dots. The exact size of the dots will be set in the Experiment Designer for these two dots only.

If the Cyberglove is enabled and the virtual hand visible, a virtual hand model will appear in the scene. If no calibration has been set for the virtual hand, then no fingers will move. The hand itself will still be moved via PPT trackers (if applicable) or the Intersense InertiaCube (if applicable). Once calibration has been set, each of the fingers should move according to inputs from the Cyberglove.

If the eye trackers are enabled, a disc representing the approximate position of the user's gaze will appear in the scene. This gaze visualization can be toggled on and off using the "Gaze Visualization" button in the middle-right side of the screen After pressing Start, the first trial will begin. The first trial (and experiment) starting will trigger the output of the objectData.csv file described above, as well as a calibration file for the Cyberglove (if applicable). The calibration file is described in further detail below. The Start Button will change into a Pause Button. When pressed, the Pause Button will pause the timer, but all other processes will continue. Interactions are possible, triggering is possible, and data will still be gathered.

Each trial is conducted. At the start of every trial, the timer will be reset to the length of the current trial. The condition name will be updated and any objects set to spawn at the beginning of the trial will appear. If a cue is selected in the Experiment Designer, a cue noise will indicate the trial has begun. At the conclusion of every trial, all objects created for that trial will be destroyed. An output file will be sent to the output directory with all information gathered from the trial. The next trial will not begin until the tab button is held down, indicating the subject is ready for the next trial. After the last trial is conducted, the final output file is exported, a distinct noise is played and the program shuts down.

Exports include the following. FIG. 10 shows an example of the ObjectData.csv file, which contains all of the information about objects set in the Experiment Designer.

Figure 9:
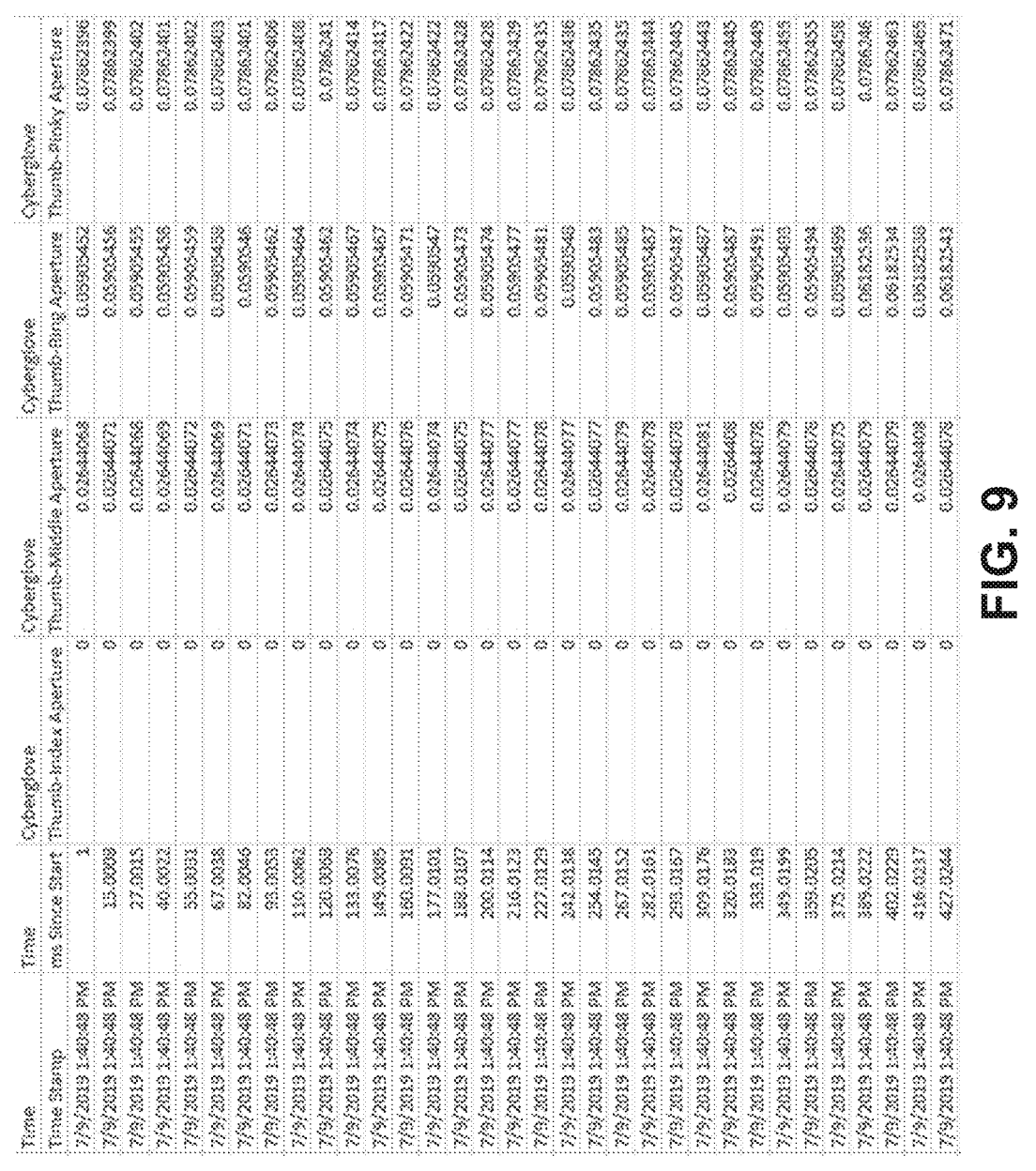

An example of the Trial Data is shown in FIG. 9. The data contains all data related to the operation of the experiment. The Device section shows device specific attributes. The data is output at the conclusion of every trial.

Figure 11:
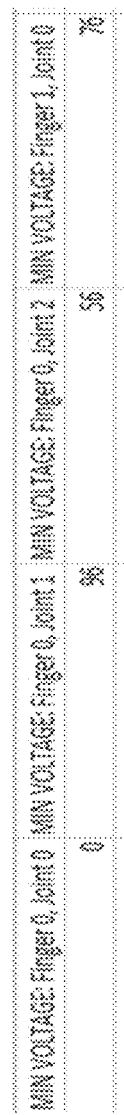
FIG. 11 is a table showing an example an calibration data from a Cyberglove in accordance with one or more embodiments.

An example of the CalibrationData.csv data is shown in FIG. 11. The data contains the calibration data from the Cyberglove. The data is output when the experiment is started if the Cyberglove is being used.

Exports also include BadTrials.txt, which contains a list of newline separated trial numbers. It is only output if the "Bad Trial" button is pressed at least once during the experiment. The data is output at the conclusion of the experiment.

Calibration routines for the Cyberglove are as follows. The user is given the option to either import a calibration file or create a new calibration. Importing works by using the File Explorer to select a previous file.

Figure 1B:
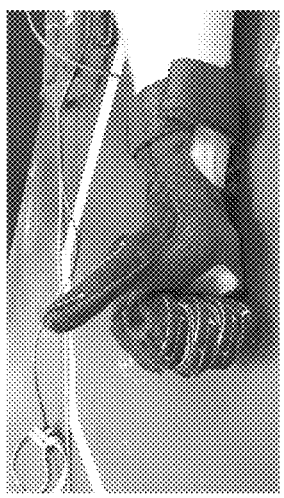
Figure 1E:
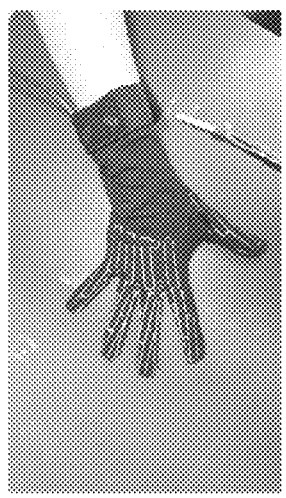
Figure 1A:
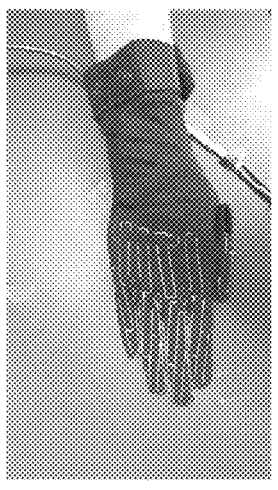
Figure 1D:
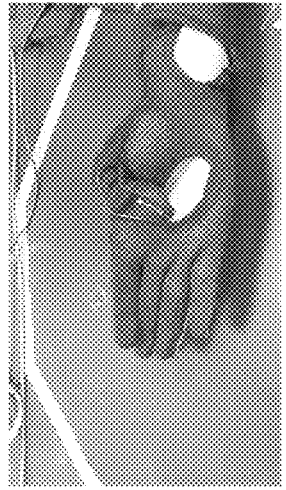

If a new calibration is to be created. The following poses are performed: (1) Flat (FIG. 1A). (2) first (FIG. 1B). The position of the thumb is unimportant during this calibration step. (3) Thumb Roll (FIG. 1C). (4) Thumb Bent (FIG. 1D). (5) Splayed (FIG. 1E).

Triggers are stimuli in the virtual or real environment that cause a reaction in the virtual or physical world. Triggers can be caused by devices or not. A device trigger example is a joint on the Cyberglove reaching a desired bend angle. A non-device trigger example is the start of the trial. A list of per-device triggers can be found in the "Devices Supported" section. Triggers are set in the Experiment Designer.

Reactions are changes in virtual or real environment brought about from a trigger happening. Reactions can be virtual or not. A virtual reaction example is an object changing dimension or position. When an object does this, it is referred to as a perturbation. A non-virtual reaction example is a device moving the user's hand. Reactions are set in the Experiment Designer.

Non-device Triggers and Reactions are as follows. The start of a trial can be a trigger. The display of a cue can be a trigger. The release of the TAB key can be a trigger.

Every object, if marked perturbable in the Experiment Designer, can have its dimensions, rotation and positions change based on a trigger.

Devices Supported include a Cyberglove III. Uses include capturing joint angles for all finger joints and capturing abduction values for all fingers. The Cyberglove can trigger based on any finger's joint angle. It can trigger based on aperture values for any two fingers. The Cyberglove cannot cause a reaction. The Cyberglove Device Configuration Utility should be on and connected to use the Cyberglove with the Experiment Runner The Intersense InertiaCube4 measures rotation and placed on the wrists. It rotates the virtual hand if enabled. It can trigger based on rotation values. The InertiaCube cannot cause a reaction. There are no additional steps needed to use the InertiaCube4.

The WorldViz PPT tracks multiple trackers in 3D space. It can trigger based on any tracker's position in 3D space. The PPT system cannot cause a reaction. PPT Studio N should be used to calibrate the PPT Camera system before use with the Experiment runner. PPT Studio N should also be running when using the PPT trackers in the Experiment Runner The HTC Vive Pro is a head-mounted display (HMD) displaying a virtual environment. It can measure user position and rotation. The HTC Vive Pro cannot cause any triggers. The HTC Vive Pro cannot cause a reaction. SteamVR must be installed to use an HTC Vive Pro headset The Oculus DK II is a HMD displaying a virtual environment. It can measure user rotation. The Oculus DK II cannot cause any triggers or reactions. Oculus Home must be installed to use the Oculus headset.

Pupil Labs Eye Trackers measures eye data, including position, size, and gaze direction for each eye. The Pupil Labs Eye trackers cannot cause any triggers or reactions. The Pupil Service, an application from Pupil Labs, must be running to use the eyetrackers with the Experiment Runner The DAQ can send an electrical signal to an NI-DAQ card. The DAQ cannot cause any triggers.

The DAQ can send signals along 3 separate channels, analog or digital. The DAQ requires no additional programs running to use.

The Unity development engine was used to design the application.

Figure 12:
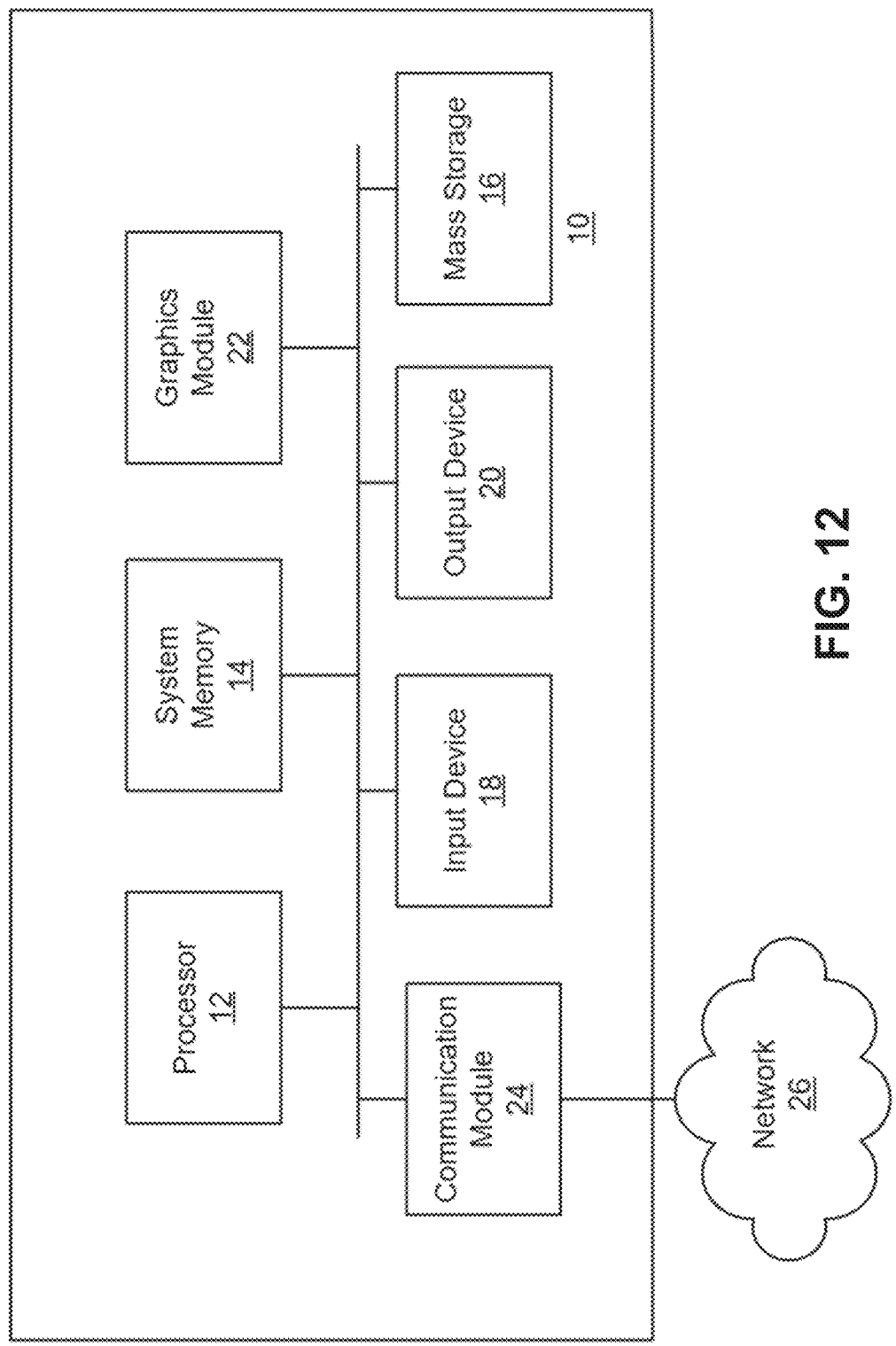
FIG. 12 is a simplified block diagram illustrating an exemplary computer system for designing and conducting virtual reality experiments in accordance with one or more embodiments.

The methods, operations, modules, and systems described herein for designing and conducting virtual reality experiments may be implemented in one or more computer programs executing on a programmable computer system. FIG. 12 is a simplified block diagram illustrating an exemplary computer system 10, on which the computer programs may operate as a set of computer instructions. The computer system 10 includes at least one computer processor 12, system memory 14 (including a random access memory and a read-only memory) readable by the processor 12. The computer system also includes a mass storage device 16 (e.g., a hard disk drive, a solid-state storage device, an optical disk device, etc.). The computer processor 12 is capable of processing instructions stored in the system memory or mass storage device. The computer system additionally includes input/output devices 18, 20 (e.g., a display, keyboard, pointer device, etc.), a graphics module 22 for generating graphical objects, and a communication module or network interface 24, which manages communication with other devices via telecommunications and other networks 26.

Each computer program can be a set of instructions or program code in a code module resident in the random access memory of the computer system. Until required by the computer system, the set of instructions may be stored in the mass storage device or on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

The invention claimed is:

1. A computer-implemented method for designing and conducting virtual reality experiments, comprising the steps of:
   (a) providing a configuration user interface through a computer system enabling a user to design a virtual reality experiment, including by designing one or more virtual objects to be handled by a subject in the virtual reality experiment, integrating one or more peripheral sensors within an immersive virtual environment, wherein the one or more peripheral sensors are located on a hand and finger of a data glove worn by the subject and are represented by a virtual hand within the immersive virtual environment, and wherein a plurality of device triggers for the one or more peripheral sensors, which include finger bend angles desired by the subject, are specified by the user;
   (b) running the virtual reality experiment configured in step (a) and collecting experiment data from the one or more peripheral sensors, wherein said collecting comprises motion capture of the subject by the one or more peripheral sensors on the hand and finger of the data glove during handling of the one or more virtual objects within the immersive virtual environment by the virtual hand, and said collecting further comprises receiving the plurality of device triggers from the one or more peripheral sensors, and wherein one or more reactions is provided in the virtual reality environment in response to said plurality of device triggers; and (c) outputting the experiment data.

2. The method of claim 1, wherein the virtual reality experiment is configured to study and train human motor behavior.

3. The method of claim 1, wherein step (a) comprises configuring a plurality of virtual environment parameters for the virtual reality experiment, said virtual environment parameters including specification of the one or more peripheral sensors, specification and placement of one or more virtual objects in a virtual environment, and physics of the virtual environment.

4. The method of claim 3, wherein the configuration user interface allows the user to (a) specify events to occur during the virtual reality experiment, (b) store information about the subject, (c) specify the one or more peripheral devices to be used during the experiment, (d) configure the one or more virtual objects for the virtual reality experiment, and (e) output a file containing information needed to launch the virtual reality experiment.

5. The method of claim 1, wherein step (b) further comprises calibrating the one or more peripheral devices before running the virtual reality experiment.

6. The method of claim 1, wherein step (b) comprises rendering a virtual scene of the virtual environment in a virtual reality headset worn by the subject.

7. The method of claim 1, wherein step (b) comprises providing an experimenter user interface to the user running the virtual reality experiment.

8. The method of claim 1, wherein the experiment data output in step (c) contains information on events observed during a single trial.

9. A computer system, comprising:
at least one processor;
memory associated with the at least one processor;
a display; and
a program supported in the memory for designing and conducting virtual reality experiments, the program containing a plurality of instructions which, when executed by the at least one processor, cause the at least one processor to:
(a) providing a configuration user interface through a computer system enabling a user to design a virtual reality experiment, including by designing one or more virtual objects to be handled by a subject in the virtual reality experiment, integrating one or more peripheral sensors within an immersive virtual environment, wherein the one or more peripheral sensors are located on a hand and finger of a data glove worn by the subject and are represented by a virtual hand within the immersive virtual environment, and wherein a plurality of device triggers for the one or more peripheral sensors, which include finger bend angles desired by the subject, are specified by the user;

(b) running the virtual reality experiment configured in step (a) and collecting experiment data from the one or more peripheral sensors, wherein said collecting comprises motion capture of the subject by the one or more peripheral sensors on the hand and finger of the data glove during handling of the one or more virtual object within the immersive virtual environment by the virtual hand, and said collecting further comprises receiving the plurality of device triggers from the one or more peripheral sensors, and wherein one or more reactions is provided in the virtual reality environment in response to said plurality of device triggers; and (c) outputting the experiment data.

10. The system of claim 9, wherein (a) comprises configuring a plurality of virtual environment parameters for the virtual reality experiment, said virtual environment parameters including specification of the one or more peripheral sensors, specification and placement of one or more virtual objects in a virtual environment, and physics of the virtual environment.

11. The system of claim 10, wherein the configuration user interface allows the user to (i) specify events to occur during the virtual reality experiment, (ii) store information about the subject, (iii) specify the one or more peripheral sensors to be used during the experiment, (iv) configure the one or more virtual objects for the virtual reality experiment, and (v) output a file containing information needed to launch the virtual reality experiment.

12. The system of claim 9, wherein (b) further comprises calibrating the one or more peripheral devices before running the virtual reality experiment.

13. The system of claim 9, wherein (b) comprises rendering a virtual scene of the virtual environment in a virtual reality headset worn by the subject.

14. The system of claim 9, wherein (b) comprises providing an experimenter user interface to the user running the virtual reality experiment.

* * * * *